(12) United States Patent
Lee

(10) Patent No.: US 6,237,344 B1
(45) Date of Patent: May 29, 2001

(54) DIMPLED IMPINGEMENT BAFFLE

(75) Inventor: Ching-Pang Lee, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/119,178

(22) Filed: Jul. 20, 1998

(51) Int. Cl.⁷ .................................................. F02C 1/00
(52) U.S. Cl. .............................................. 60/754; 165/908
(58) Field of Search ........................... 60/754, 755, 757; 165/908, 170

(56) References Cited

U.S. PATENT DOCUMENTS

| | | |
|---|---|---|
| 3,032,314 | 5/1962 | David . |
| 3,301,527 | 1/1967 | Kercher . |
| 4,064,300 | 12/1977 | Bhangu ................................. 428/120 |
| 4,077,205 | 3/1978 | Pane et al. ........................... 60/39.32 |
| 4,105,364 | 8/1978 | Dodd ................................... 416/97 R |
| 4,269,032 | 5/1981 | Meginnis et al. ....................... 60/754 |
| 4,312,186 | 1/1982 | Reider ..................................... 60/754 |
| 4,422,300 | * 12/1983 | Dierberger et al. ................... 60/757 |
| 4,485,630 | 12/1984 | Kenworthy ............................. 60/757 |
| 4,695,247 | * 9/1987 | Enzaki et al. ....................... 60/755 X |
| 4,887,663 | * 12/1989 | Auxier et al. ...................... 60/757 X |
| 5,083,422 | * 1/1992 | Vogt ................................... 60/757 X |
| 5,265,409 | * 11/1993 | Smith, Jr. et al. .................. 60/39.02 |
| 5,687,572 | * 11/1997 | Schrantz et al. ................... 60/754 X |
| 6,000,908 | * 12/1999 | Bunker ................................. 165/908 |

* cited by examiner

Primary Examiner—Charles G. Freay
Assistant Examiner—David J. Torrente
(74) Attorney, Agent, or Firm—Andrew C. Hess; Rodney M. Young

(57) ABSTRACT

An impingement baffle in the form of a plate includes spaced apart impingement holes for directing cooling air in corresponding jets against a hot wall. Dimples are integrally formed in the plate adjacent corresponding ones of the impingement holes for shielding thereof.

21 Claims, 2 Drawing Sheets

DIMPLED IMPINGEMENT BAFFLE

BACKGROUND OF THE INVENTION

The present invention relates generally to gas turbine engines, and, more specifically, to impingement cooling therein.

In a gas turbine engine, air is pressurized in a compressor and mixed with fuel in a combustor and ignited for generating hot combustion gases which flow through one or more turbine stages. The combustor and various components downstream therefrom are therefore subject to heating from the hot combustion gases and are typically cooled for obtaining a suitable useful life thereof.

The combustor itself is typically cooled by providing film cooling holes through which a portion of compressor discharge air is channeled for developing a boundary layer or film of cooling air along the inner surface of a combustor liner which protects the liner from the hot combustion gases and provides cooling thereof.

Disposed immediately downstream from the combustor is a high pressure turbine nozzle having a row of hollow turbine vanes through which another portion of the compressor air is channeled for providing internal cooling thereof.

In both of these examples, enhanced cooling may be provided using an impingement baffle having a plurality of laterally spaced apart impingement holes through which respective portions of the cooling air is directed in jets against the outboard surfaces of the combustor liner or against the inboard surfaces of the turbine vanes. Impingement air provides local cooling of the corresponding hot walls subject to the combustion gases on the opposite sides thereof, and is typically used in conjunction with other forms of cooling such as film cooling. The spent impingement air may therefore be used initially for impingement cooling and then may be discharged through the hot wall as film cooling air for performing double duty and maximizing the cooling effectiveness thereof.

Impingement baffles require close spacing with the hot wall through which the spent impingement air is channeled after impinging the wall. The spacing is maintained by using spacers in the form of ribs or solid tabs which extend between the baffle and the hot wall. The tabs must be integrally formed with at least one of the two components, and are therefore subject to local variation in temperature distribution due to heat transfer between the hot wall and the relatively cool impingement baffle. Local temperature variation results in local differences in thermal stress which must be minimized for obtaining a useful life.

Crossflow of the spent impingement air channeled between the baffle and the hot wall degrades the effectiveness of downstream impingement jets by deflection thereof from the preferred normal impingement. The spacer tabs may be used to advantage by being configured and spaced between adjacent impingement holes for providing local shields to protect downstream impingement jets from the crossflow resulting from impingement jets upstream therefrom. However, solid integral spacer tabs introduce relatively large thermal stress due to associated temperature gradients between the cool baffle and the hot wall which can reduce the useful life thereof.

Furthermore, the individual spacer tabs require precise placement adjacent to the impingement holes for being effective, with misalignment thereof degrading the shielding effectiveness. Yet further, integral spacer tabs limit the ability to introduce inclined film cooling holes through the hot wall which are typically made therein by drilling, using lasers for example. Since it is impermissible to damage a spacer tab when laser drilling the film cooling holes, the holes must be maintained at a suitable distance from respective ones of the tabs to prevent damage thereto. This limits the area in which the film cooling holes may be placed and thusly affects the cooling effectiveness thereof and the corresponding life of the parts.

Accordingly, it is desired to provide an improved impingement baffle which is readily manufactured, and has reduced thermal stress during operation and does not interfere with the formation of the film cooling holes for example.

BRIEF SUMMARY OF THE INVENTION

An impingement baffle in the form of a plate includes spaced apart impingement holes for directing cooling air in corresponding jets against a hot wall. Dimples are integrally formed in the plate adjacent corresponding ones of the impingement holes for shielding thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
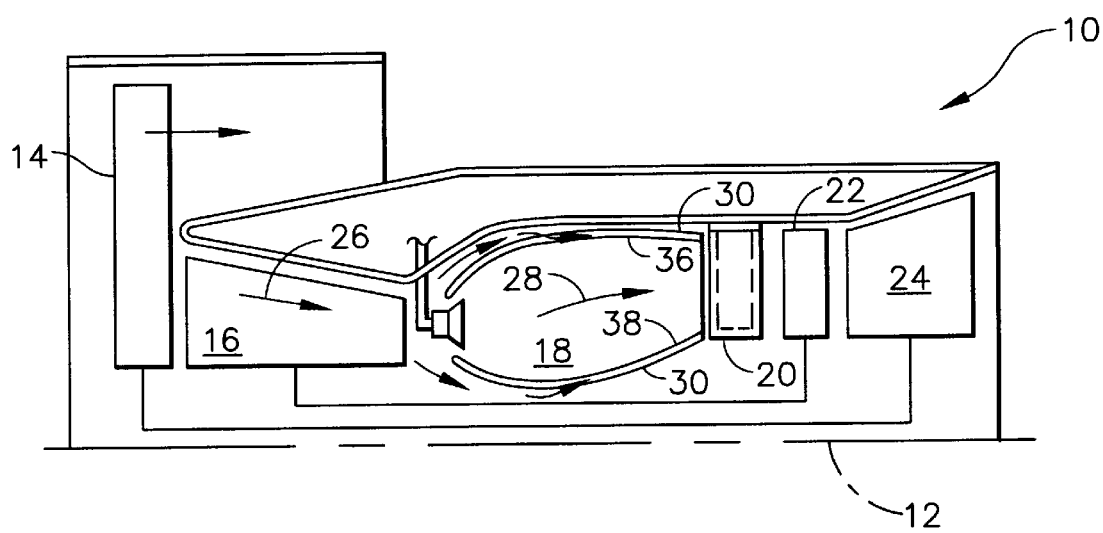
FIG. 1 is a schematic axial sectional view of an aircraft turbofan gas turbine engine including a combustor and turbine nozzle cooled in accordance with exemplary embodiments of the present invention.

Illustrated schematically in FIG. 1 is an aircraft turbofan gas turbine engine 10 including in serial flow communication about a longitudinal or axial centerline axis 12 a fan 14, compressor 16, combustor 18, high pressure turbine nozzle 20, high pressure turbine blades 22, and a low pressure turbine 24.

Air 26 is pressurized in the compressor 16 and flows to the combustor 18 wherein it is mixed with fuel and ignited for generating hot combustion gases 28 which flow downstream through the nozzle 20 for rotating the blades 22 and powering the compressor, and also rotates blades of the turbine 24 for powering the fan 14.

Since the combustion gases 28 are hot the various engine components in contact therewith must be suitably cooled by using a portion of the compressor air 26 as a cooling fluid. For example, the combustor 18 and turbine nozzle 20 may be cooled in accordance with the present invention by utilizing the cooling air 26 obtained from the compressor.

Figure 2:
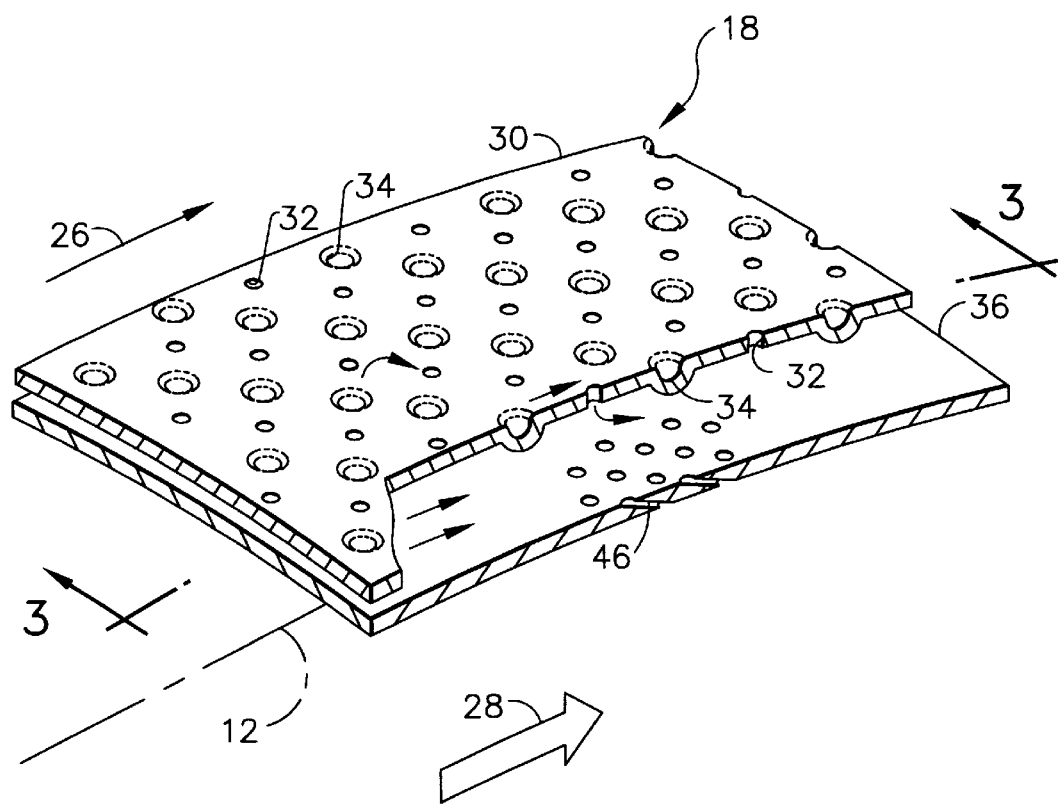
FIG. 2 is an isometric view of a portion of an outer liner of the combustor shown in FIG. 1 illustrating a portion of an impingement baffle cooperating therewith in accordance with an exemplary embodiment.

More specifically, and referring to FIG. 2, a portion of the combustor 18 configured in accordance with an exemplary embodiment of the invention is illustrated. An impingement baffle 30 in the form of a thin plate is suitably configured to match the required profile of the combustor through which the hot combustion gases 28 flow. The baffle 30 includes a plurality of laterally spaced apart impingement apertures or holes 32 through which respective portions of the cooling air 26 is channeled. The baffle 30 also includes a plurality of dimples 34 integrally formed in the same plate adjacent corresponding ones of the impingement holes 32.

In the exemplary embodiment illustrated in FIG. 2, the impingement baffle 30 cooperates with an annular, radially outer combustor liner 36 for impingement cooling thereof. As shown in FIG. 1, the baffle 30 radially surrounds the outer liner 36 over any suitable portion thereof such as its entire extent if desired. In an alternate embodiment, a similar impingement baffle 30 may be disposed radially inwardly of an annular radially inner combustor liner 38 for providing impingement cooling thereof in the same manner as the outer liner 36.

As shown in FIG. 2, the impingement holes 32 are sized and patterned in any conventional manner for directing the cooling air 26 in corresponding jets substantially perpendicularly against the outboard surface of the hot wall defined by the outer liner 36.

Figure 3:
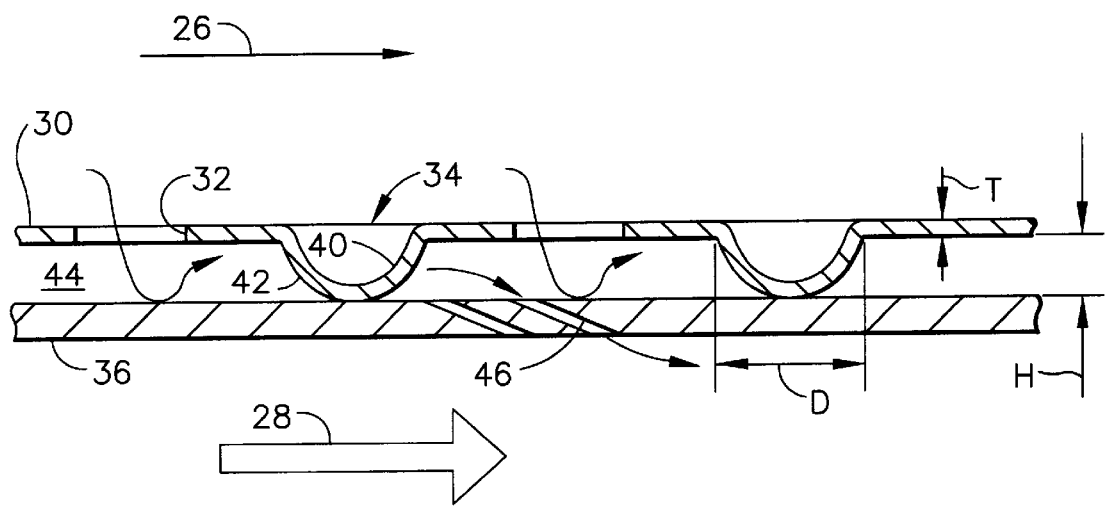
FIG. 3 is an enlarged axial sectional view through a portion of the outer liner and cooperating impingement baffle illustrated in FIG. 2 and taken along line 3—3.

An enlarged axial section of the impingement baffle 30 and cooperating outer liner 36 is illustrated in more detail in FIG. 3. Each of the dimples 34 includes a concave depression or recess 40 on the radially outer or outboard surface or side of the baffle over which the cooling air 26 initially flows. Each dimple 34 also includes an opposite convex protrusion or bump 42 on the radially inner or inboard surface or side of the baffle which faces the radially outer surface of the liner 36.

Each of the dimples 34 is preferably spherical in contour, such as a hemisphere for example, and is integrally formed with the baffle plate itself having a substantially constant thickness T. The recess 40 and bump 42 of each dimple are correspondingly concave and convex in three dimensions defining the spherical contour thereof. Each dimple 34 extends from a circular base of maximum diameter D at the inboard side of the baffle plate to an apex spaced away therefrom at a corresponding height H.

As shown in FIGS. 2 and 3, the impingement holes 32 and dimples 34 are preferably aligned in a symmetrical pattern having a plurality of the dimples laterally surrounding a corresponding one of the impingement holes. Each of the dimples 34 is linearly aligned between adjacent ones of the impingement holes 32 to shield a downstream impingement hole and its cooling air jet from an upstream impingement hole and the crossflow created from the spent cooling jet thereof. In this way, each of the dimples 34 may be associated with one or more of the downstream impingement holes 32 to protect the air jets thereof from the crossflow cooling degradation.

Of particular significance in the present invention is the integral formation of the dimples 34 in the baffle plate itself for cooperating with the combustor liner 36 for impingement cooling. The baffle plate itself is preferably a unitary sheet metal stamping integrally including both the impingement holes 32 and dimples 34. The sheet metal baffle is sufficiently ductile so that the impingement holes 32 may be punched out using a suitable punch during manufacture while simultaneously plastically forming the individual dimples 34 using a corresponding spherical die and cooperating mold. Alternatively, the baffle could be cast.

The impingement baffle 30 is used in combination with the hot wall, defined by the outer liner 36 for example, with the individual bumps 42 adjoining, preferably in abutting contact with, the outboard surface of the hot wall for maintaining a flow channel 44 between the inboard side of the baffle and the outboard side of the hot wall for channeling the impingement air 26 therethrough. The dimples 34 are preferably identical with identical heights H to form a substantially constant-height flow channel 44 with the same height H. The baffle 30 may be mounted to the outer liner 36 in any suitable manner, such as tack welded at selected ones of the dimples 34 for example.

Accordingly, a majority, if not all, of the dimples 34 merely abut the liner 36 and are not fixedly attached thereto. This has several advantages in both the manufacturing of the impingement baffle 30 itself separately from the combustor liner 36, and for reducing the thermal gradients and corresponding stress during operation. Since the dimples 34 are spherical and hollow, they have reduced weight over an otherwise solid protrusion which reduces overall weight of the engine. And, the hollow configuration also reduces thermal mass. The thin dimples 34 therefore have a faster thermal response time as temperature changes which reduces thermal gradients and associated thermal stress therefrom. Since the dimples 34 are circular in cross section they also reduce associated stress concentrations thereat.

Furthermore, the spherical configuration of the dimples 34 maximizes their crossflow shielding capability in the plane of the cooperating impingement holes 32, and decreases in flow blockage toward their apexes where they abut the liner 36 at a generally point location. Since the contact area of each dimple with the liner 36 is minimal at the apexes, heat conduction therebetween is also minimized. The spherical shape also reduces dimple weight since they decrease in cross section from their bases to their apexes while still providing flow shields protecting downstream impingement holes and the jets emanating therefrom.

Since the dimples 34 are preferably integrally formed in the baffle along with the impingement holes 32, accuracy in position therebetween may be maintained which is independent of assembly of the baffle 30 atop the combustor liner 36.

An additional advantage of the dimpled impingement baffle 30 is illustrated in FIG. 3. The combustor liner 36 may include a plurality of film cooling holes 46 disposed in a closely spaced multihole pattern, with the individual holes 46 being inclined in the downstream direction in the exemplary range of about 20°–30°. The multiholes 46 may be conventionally formed using laser drilling in a manufacturing step independent of the impingement baffle and prior to assembly thereof.

In this way, the individual multiholes 46 may be drilled without regard for damaging the dimples 34 since the impingement baffle 30 is later attached to the liner 36. The pattern of the multiholes 46 may then be optimized irrespective of the location of the dimples 34 and may be spaced closely adjacent thereto as desired. When the impingement baffle 30 is mounted to the outer liner 36, the individual bumps 42 abut the liner, and the multiholes 46 may be aligned with corresponding ones of the dimples 34 without regard to drilling damage thereof since the dimples 34 are not present when the multiholes are formed.

Figure 4:
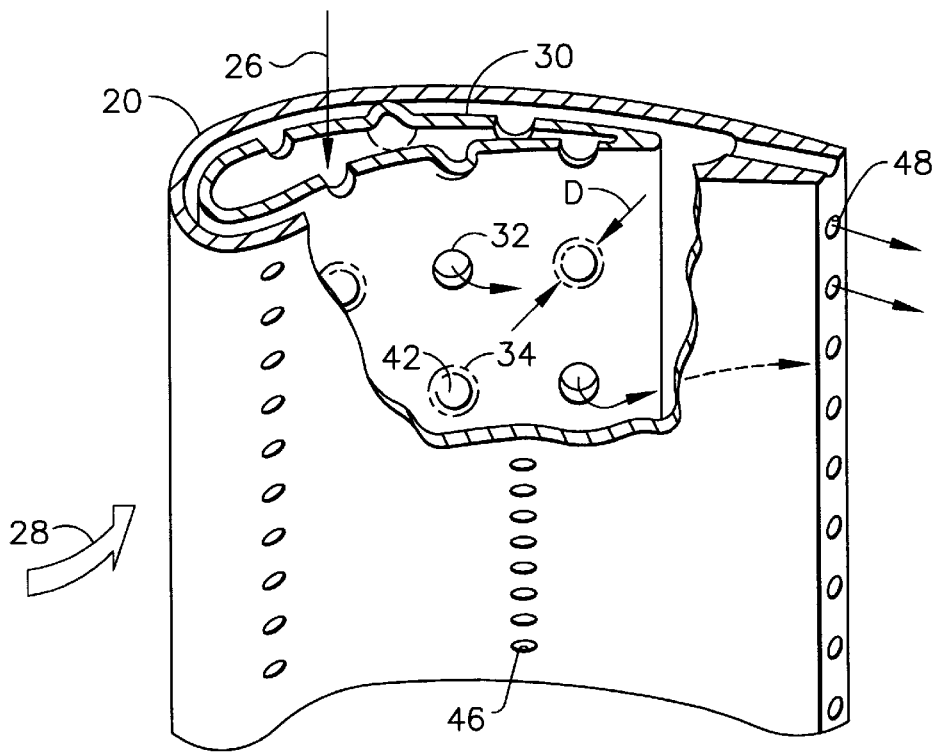
FIG. 4 is an elevational, partly sectional view of a portion of one of the high pressure turbine nozzle vanes illustrated in FIG. 1 including an impingement baffle disposed therein in accordance with another embodiment of the present invention.

As indicated above, the impingement baffle 30 may be configured as desired for use in various components of the engine 10 which may benefit from using impingement cooling. Another example is illustrated in FIG. 4 and includes the vanes of the turbine nozzle 20 which are hollow for receiving another portion of the cooling air 26 from the compressor. Each vane 20 may include one or more impingement baffles 30 in the form of inserts which match the inner contour of the vanes.

The impingement holes 3 and dimples 34 are similarly formed therein, with the cooling air 26 initially flowing inside the impingement baffle 30 for flow out the individual impingement holes 32 for impingement cooling the inner surface of the vane 20. The dimples 42 provide spacers for maintaining a constant height airflow channel around the baffle 30 inside the individual vanes 20.

The nozzle vanes 20 typically include trailing edge discharge holes 48 through which the spent impingement air is discharged during operation. The vanes 20 typically also include one or more rows of film cooling holes, also designated 46, through which a portion of the spent impingement air may be discharged for providing a cooling film layer over the outer surface of the vane 20 during operation.

In both embodiments illustrated in FIGS. 2 and 4, the impingement baffles 30 including the impingement holes 32 and dimples 34 operate substantially identically and are different only in the specific configurations required for cooling the outer combustor liner 36 and the individual nozzle vanes 20. Further modifications of the impingement baffle are required for impingement cooling the combustor inner liner 38, and for impingement cooling other components in the engine such as flow ducts (not shown) which require cooling against the heating effects of the hot combustion gases 28.

Accordingly, a relatively low cost impingement baffle 30 may now be fabricated in a relatively simple single stamping process, or casting, for integrally forming the impingement holes 32 and cooperating shielding dimples 34. The reduced weight and thermal mass of the hollow dimples enjoys improved thermal performance of the baffle with reduced thermal stress.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A baffle for directing cooling air in impingement against a hot wall comprising:
   a plate having a plurality of spaced apart impingement holes for directing said air in corresponding jets against said hot wall; and
   a plurality of dimples integrally formed in said plate upstream from corresponding ones of said holes to shield said holes from crossflow of said air.

2. A baffle according to claim 1 wherein each of said dimples comprises a concave recess on an outboard side of said plate and an opposite convex bump on an inboard side of said plate.

3. A baffle according to claim 2 wherein each of said dimples is spherical, and extends from a base of maximum diameter at said inboard side to an apex at a height therefrom.

4. A baffle according to claim 3 wherein each of said dimples is aligned between adjacent ones of said impingement holes 32.

5. A baffle according to claim 4 wherein said plate is a sheet metal stamping integrally including both said inlet holes and dimples.

6. A baffle according to claim 4 in combination with said hot wall, with said bumps adjoining said hot wall for maintaining a flow channel between said plate inboard side and said hot wall for said impingement air.

7. An apparatus according to claim 6 wherein said impingement holes and dimples are aligned in a pattern having a plurality of said dimples laterally surrounding a corresponding one of said holes.

8. An apparatus according to claim 7 wherein said hot wall comprises a gas turbine engine combustor liner.

9. An apparatus according to claim 8 wherein said combustor liner includes a plurality of film cooling holes and said baffle bumps abut said liner.

10. An apparatus according to claim 7 wherein said hot wall comprises a gas turbine engine nozzle vane.

11. A gas turbine engine impingement baffle comprising a plate having a plurality of spaced apart impingement holes and corresponding imperforate dimples aligned between adjacent ones of said holes.

12. A baffle according to claim 11 wherein each of said dimples is a hemisphere, and extends from a base of maximum diameter at said plate to an apex at a height therefrom.

13. A baffle according to claim 12 wherein each of said dimples includes a concave recess on one side of said plate and an opposite convex bump on an opposite side of said plate.

14. A baffle according to claim 13 wherein said impingement holes and dimples are aligned in a pattern having a plurality of said dimples laterally surrounding a corresponding one of said holes.

15. A baffle according to claim 14 wherein said plate is sheet metal having a substantially constant thickness, and said dimples protrude higher than said impingement holes to shield corresponding ones thereof.

16. An impingement baffle in combination with a gas turbine engine combustor liner comprising a plate having a plurality of spaced apart impingement holes facing said liner for directing cooling air jets substantially perpendicular thereagainst, and a plurality of dimples integrally formed in said plate between adjacent ones of said impingement holes and having convex sides facing said liner for abutment therewith.

17. An apparatus according to claim 16 wherein each of said dimples is spherical, and extends from a base of maximum diameter at said plate to an apex at a height therefrom.

18. An apparatus according to claim 17 wherein said liner includes a plurality of film cooling holes inclined therethrough in alignment with corresponding ones of said dimples.

19. An impingement baffle in combination with a gas turbine engine nozzle vane comprising a plate disposed inside said vane, and having a plurality of spaced apart impingement holes facing an internal surface of said vane for directing cooling air jets substantially perpendicular thereagainst, and a plurality of dimples integrally formed in said plate between adjacent ones of said impingement holes and having convex sides facing said vane internal surface for abutment therewith.

20. An apparatus according to claim 19 wherein each of said dimples is spherical, and extends from a base of maximum diameter at said plate to an apex at a height therefrom.

21. A baffle for directing cooling air in impingement against a hot wall comprising:

a plate having a plurality of spaced apart impingement holes for directing said air in corresponding jets against said hot wall; and a plurality of dimples integrally formed in said plate adjacent corresponding ones of said holes, and each of said dimples is spherical and includes a concave recess on an outboard side of said plate and an opposite convex bump on an inboard side of said plate, and extends from a base of maximum diameter at said inboard side to an apex at a height therefrom.

* * * * *